(12) United States Patent
Saltzgiver et al.

(10) Patent No.: US 10,161,782 B2
(45) Date of Patent: Dec. 25, 2018

(54) LIQUID CONSUMPTION TRACKER

(71) Applicant: Trago, Inc., Austin, TX (US)

(72) Inventors: Davis Michael Saltzgiver, Austin, TX (US); Jac Tyson Saltzgiver, III, Austin, TX (US)

(73) Assignee: Trago, Inc., Austin, TX (US)

( * ) Notice: Subject to any disclaimer, the term of this patent is extended or adjusted under 35 U.S.C. 154(b) by 587 days.

(21) Appl. No.: 14/804,674

(22) Filed: Jul. 21, 2015

(65) Prior Publication Data

US 2016/0025545 A1    Jan. 28, 2016

Related U.S. Application Data

(60) Provisional application No. 62/028,812, filed on Jul. 25, 2014.

(51) Int. Cl.
G01F 23/296    (2006.01)
G01F 23/26     (2006.01)
H04Q 9/00      (2006.01)
B65D 1/02      (2006.01)
B65D 51/24     (2006.01)
A47G 23/16     (2006.01)

(52) U.S. Cl.
CPC .......... *G01F 23/296* (2013.01); *A47G 23/16* (2013.01); *B65D 1/0246* (2013.01); *B65D 51/245* (2013.01); *G01F 23/26* (2013.01); *G01F 23/263* (2013.01); *G01F 23/2962* (2013.01); *H04Q 9/00* (2013.01); *H04Q 2209/40* (2013.01)

(58) Field of Classification Search
CPC .................................................. G01F 23/2962
See application file for complete search history.

(56) References Cited

U.S. PATENT DOCUMENTS

| | | | | |
|---|---|---|---|---|
| 4,145,925 A | * | 3/1979 | Stasz | G01F 1/663 73/861.25 |
| 4,888,740 A | * | 12/1989 | Brie | G01V 1/50 181/102 |
| 4,901,245 A | * | 2/1990 | Olson | G01F 23/296 340/621 |
| 5,160,870 A | | 11/1992 | Carson et al. | |

(Continued)

OTHER PUBLICATIONS

Non-Final Office Action for related U.S. Appl. No. 15/012,394, dated Sep. 23, 2016, pp. 1 to 16.

(Continued)

*Primary Examiner* — Lisa Caputo
*Assistant Examiner* — Alex Devito
(74) *Attorney, Agent, or Firm* — Pillsbury Winthrop Shaw Pittman LLP

(57) ABSTRACT

Provided is a sensor operative to track changes in a liquid level of a hand-held liquid container, the sensor comprising: an ultrasonic liquid-level sensor configured to indicate a liquid level of a liquid in a hand-held liquid container, wherein the ultrasonic liquid-level sensor is capable of indicating the liquid level when the surface of the liquid is less than 20 centimeters away from the ultrasonic liquid-level sensor; a radio transmitter; and a processor configured to draw power from a portable power source, receive liquid-level indications from the ultrasonic liquid-level sensor, and cause the radio transmitter to transmit data indicative of changes in the liquid level.

33 Claims, 13 Drawing Sheets

(56) References Cited

U.S. PATENT DOCUMENTS

| | | | |
|---|---|---|---|
| 5,483,831 A * | 1/1996 | Steiner | G01F 23/686 |
| | | | 73/313 |
| 6,125,697 A * | 10/2000 | Holton | G01F 23/0038 |
| | | | 324/207.14 |
| 6,832,516 B1 | 12/2004 | Dam et al. | |
| 9,035,222 B2 | 5/2015 | Alexander | |
| 2004/0035197 A1 | 2/2004 | D'antonio et al. | |
| 2006/0042376 A1 | 3/2006 | Reusche et al. | |
| 2006/0129127 A1 | 6/2006 | Ruth et al. | |
| 2006/0210435 A1 | 9/2006 | Alavie et al. | |
| 2007/0254716 A1 * | 11/2007 | Matsuoka | G08B 21/10 |
| | | | 455/561 |
| 2009/0041634 A1 | 2/2009 | Cracauer et al. | |
| 2011/0166699 A1 * | 7/2011 | Palmquist | B67D 1/1234 |
| | | | 700/236 |
| 2011/0301883 A1 | 12/2011 | Murphy | |
| 2013/0059259 A1 | 3/2013 | Oldani et al. | |
| 2013/0161280 A1 | 6/2013 | Thalab | |
| 2013/0249978 A1 | 9/2013 | Wegman et al. | |
| 2014/0134585 A1 | 5/2014 | Aron et al. | |
| 2014/0202982 A1 | 7/2014 | Willows et al. | |
| 2014/0251850 A1 | 9/2014 | Huang et al. | |
| 2014/0257709 A1 | 9/2014 | Yuen et al. | |
| 2014/0261824 A1 | 9/2014 | Byers et al. | |
| 2014/0273925 A1 | 9/2014 | Burgett et al. | |
| 2015/0013646 A1 | 1/2015 | Qi | |
| 2015/0019108 A1 | 1/2015 | Hendrickson et al. | |
| 2015/0021795 A1 | 1/2015 | Bae et al. | |
| 2015/0068983 A1 | 3/2015 | Pawlow | |
| 2015/0170530 A1 | 6/2015 | Damman et al. | |
| 2015/0285775 A1 * | 10/2015 | Gurumohan | G01N 33/02 |
| | | | 702/187 |
| 2016/0037736 A1 * | 2/2016 | Rainone | G05B 19/0426 |
| | | | 700/284 |

OTHER PUBLICATIONS

'Ultrasonic Sensing Technology'; Chapter 2 of 'Ultrasonic Fluid Quantity Measurement in Dynamic Vehicular Applications', J. Terzic et al., Springer International Publishing Switzerland 2013, pp. 11 to 35.

'Reflection-mode ultrasound imaging', Chapter U, J. Fessler, Sep. 21, 2009, pp. 1 to 34.

'It's the Water Bottle of the Future—and You Can Pre-Order It Now! SELF', http://www.self.com/flash/fitnessblog/2013/10/fitnesswaterbottleofthefuture/, Amanda MacMillan, Oct. 7, 2013, pp. 1 to 3.

'Jomi's Smart Water Bottle Sleeve-Plus-App Wants to Track & Chart Your Liquid Intake to Make You Drink More', http://techcrunch.com/2013/04/14/jomidrinktracker/, Tech Crunch, Apr. 14, 2013, pp. 1 to 12.

'3D Gesture Classification With Convolutional Neural Networks', Universit'e de Lyon, CNRS INSA-Lyon, LIRIS, UMR5205, F-69621, France & Orange Labs, R&D, F-38240 Meylan, France, S. Duffner et al., pp. 1 to 5.

'Accelerometer-Based Gesture Recognition with the iPhone', Goldsmiths University of London, MSc in Cognitive Computing, Marco Klingmann, Sep. 2009, pp. 1 to 86.

'FastDTW: Toward Accurate Dynamic Time Warping in Linear Time and Space', Dept. of Computer Sciences Florida Institute of Technology, S. Salvador et al., pp. 1 to 11.

* cited by examiner

LIQUID CONSUMPTION TRACKER

CROSS-REFERENCE TO RELATED APPLICATIONS

The present application is a non-provisional of, and thus claims the benefit of, U.S. Provisional Patent Application No. 62/028,812, filed 25 Jul. 2014, titled Fluid Level Tracking Lid, the entire contents of which are hereby incorporated by reference for all purposes.

BACKGROUND

1. Field

The present invention relates generally to liquid consumption tracking and, more specifically, to automatically tracking consumption of liquids in hand-held containers.

2. Description of the Related Art

Some containers include electronics to automatically track consumption of liquids stored within the containers. For example, some gas tanks include electronic sensors that monitor the amount of gasoline in the gas tank, tracking both the addition of liquid to the tank, and consumption of liquid from the tank. Similar sensors are often used in industrial applications, for example, tracking use of chemicals in industrial processes. In some cases, such sensors have been used to track liquid consumption from portable hand-held containers of liquids, like water bottles.

Existing techniques for tracking liquid consumption from hand-held containers are deficient in a number of respects. Some techniques draw excessive battery power, making the sensors inconvenient for users who would prefer to charge the sensors less often. Further, some techniques require the sensor be used with a specific container, preventing users from using the same sensor on multiple containers of varying shapes and inconveniencing users. Finally, some sensors are relatively inaccurate.

SUMMARY

The following is a non-exhaustive listing of some aspects of the present techniques. These and other aspects are described in the following disclosure.

Some aspects include a sensor operative to track changes in a liquid level of a hand-held liquid container, the sensor comprising: an ultrasonic liquid-level sensor configured to indicate a liquid level of a liquid in a hand-held liquid container, wherein the ultrasonic liquid-level sensor is capable of indicating the liquid level when the surface of the liquid is less than 20 centimeters away from the ultrasonic liquid-level sensor; a radio transmitter; and a processor configured to draw power from a portable power source, receive liquid-level indications from the ultrasonic liquid-level sensor, and cause the radio transmitter to transmit data indicative of changes in the liquid level.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
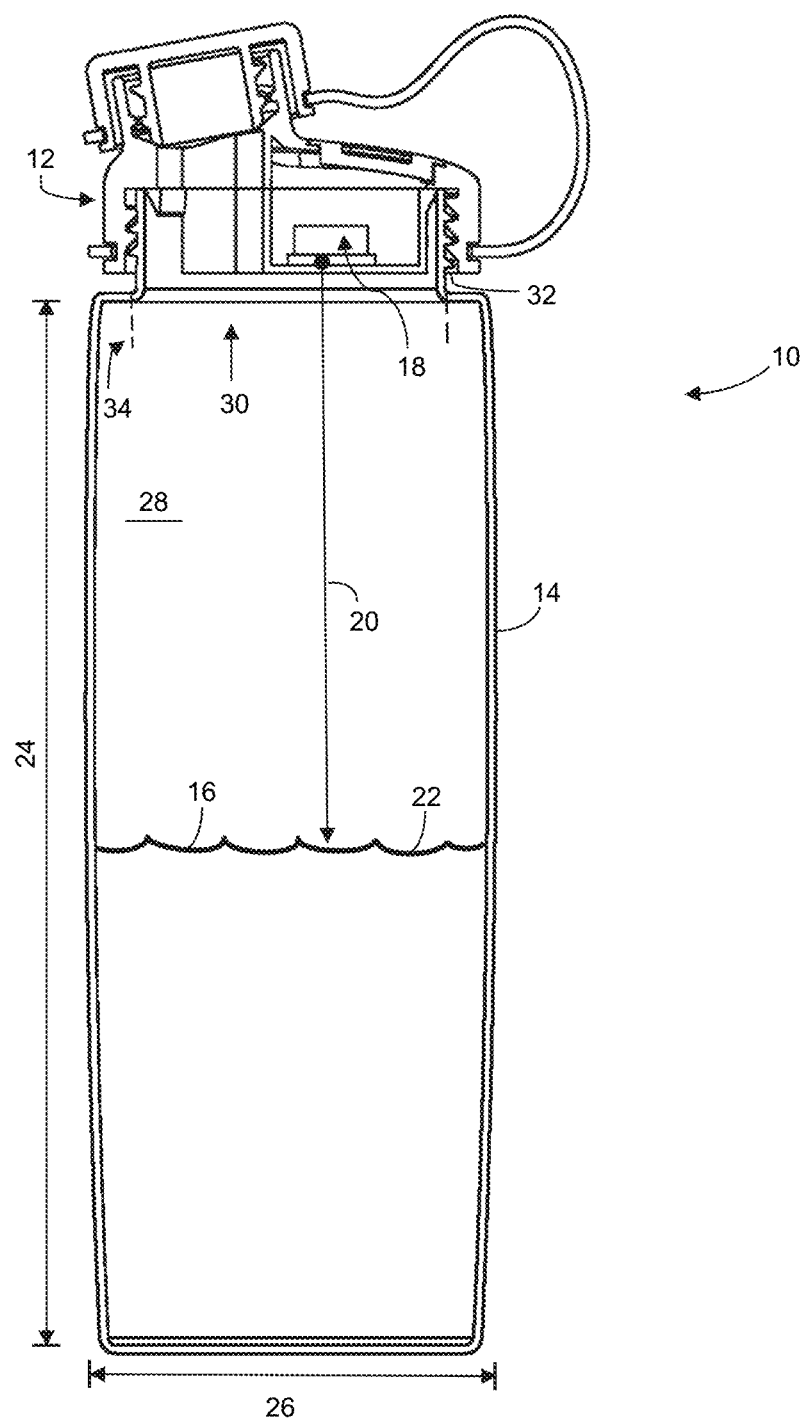
FIG. 1 is a cross-sectional plan view of a liquid dispenser in keeping with some embodiments of the present inventions.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of hydration tracking. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 shows an example of a liquid dispenser 10 that in some embodiments mitigates various subsets, and in some cases all, of the problems with traditional liquid consumption tracking techniques. In some embodiments, the liquid dispenser 10 is a water bottle with a lid configured to track water consumption in a relatively battery-friendly, accurate fashion and that in some cases can accommodate different shaped containers. In the illustrated embodiment, the liquid dispenser 10 includes a smart lid 12 attached to a bottle 14. The lid 12, in some embodiments, can be removed from the bottle 14 and attached to different bottles having different shapes, while retaining the capability of measuring the consumption of liquid from the bottles of different shapes relatively accurately.

In FIG. 1, the liquid dispenser 10 is shown in a cross-sectional plan view with liquid 16 in the bottle 14. In some embodiments, an ultrasonic liquid level sensor may measure a distance 20 between the sensor 18 and a surface 22 of the liquid 16. In some embodiments, the distance 20 may be less than distances encountered in typical industrial applications. For example, the distance 20 may be less than 20 cm, such as less than 5 cm when the bottle 14 is near full. Relatively short distances 20, for example, less than 20 cm may leave relatively short durations of time between when the ultrasonic fluid level sensor 18 transmits an ultrasonic burst and when an echo is received back at the ultrasonic liquid level sensor 18 from the surface 22 of the liquid 16. In some embodiments, the ultrasonic liquid level sensor 18 may be configured to accommodate these relatively short durations using techniques described below that mitigate interference from residual vibrations from transmission on reception of an echo.

The illustrated liquid dispenser 10, in some embodiments, may be used for tracking consumption of water, for example, in a hydration tracking system that tracks when users drink water from the liquid dispenser 10 and accounts for refills of the bottle 14. The liquid dispenser 10, however, may be used in a variety of other applications. For example, various consumer packaged goods in liquid form may be tracked. In some embodiments, other liquids that humans drink may be tracked, for example, juice, sports drinks, milk, maple syrup, and the like. In some cases, various liquids that consumers use for cleaning purposes may be tracked, such as laundry detergent, dishwasher detergent, shampoo, conditioner, and the like. In some embodiments, the lid 12 may be configured to automatically reorder replacement liquids in response to determining that the distance 20 during a measurement exceeds a threshold or that an amount of liquid falls under a threshold. In some embodiments, the threshold may be determined dynamically, for example, based on a rate of consumption, adjusting the threshold to order at higher amounts of remaining liquid when rates increase. Reordering may be effected, in some cases, by wirelessly transmitting a message from the lid 12 to a remote server via, for example, a local area network in a home, or via a Bluetooth connection to a mobile user device.

The illustrated bottle 14, in some embodiments, is shaped to be hand held. The bottle 14, in some embodiments, has a generally cylindrical shape with a height 24 ranging from 10 to 40 cm, a max diameter 26 ranging from 5 to 20 cm, and a volume for containing liquids ranging from 0.5 to 4.0 liters. In other embodiments, the container may have a different shape and may include, for example, a handle. The container (also referred to as a bottle) 14 may be shaped and sized such that the container 14 is suitable as a hand-held portable liquid container, for example, a container falling within the exemplary dimensional ranges discussed above. In some cases, the liquid dispenser 10, when filled with water, may weigh less than 5 kg to facilitate ease of use and transport.

The bottle 14 may be made a variety of materials. In some cases, the bottle 14 is a generally rigid material, such as stainless steel or a relatively rigid plastic, such as copolyester, high density polyethylene, polypropylene, were polyethylene terephthalate. In some cases the plastic may be free of Bisphenol-A. In some embodiments, the bottle 14 may be a squeeze bottle made from a flexible plastic, such as low density polyethylene. In some embodiments, the bottle 14 may have a diameter 26 sized such that the bottle 14 can fit within a user's hand by grasping the outer diameter 26 of the bottle 14. In some embodiments, a shape of the bottle may be entered into an application executing on a mobile user device, such that distances 20 can be converted into volumes of liquid. Offloading such calculations is expected to conserve power on the liquid dispenser 10, though some embodiments may perform this task on the dispenser 10 as well.

In some embodiments, the bottle 14 includes a standard 63 mm water bottle opening 30 with threads 32 suitable for mating with the lid 12. In some cases, the outer diameter of the opening 34, corresponding to an outer diameter in a region between, above, or below the threads 32, may be between 55 and 67 mm, for example, approximately 57 mm to accommodate standard water bottle lids. In some cases, the lid 12 may be capable of mating with a threaded connection to a plurality of different bottles having different shapes with a standard 63 mm opening. To this end, in some embodiments, all of the electronics of the liquid dispenser 10 are disposed within the 12, to facilitate reuse and flexibility, but in some embodiments, some or all of the electronics may be distributed in the bottle 14.

Figure 2:
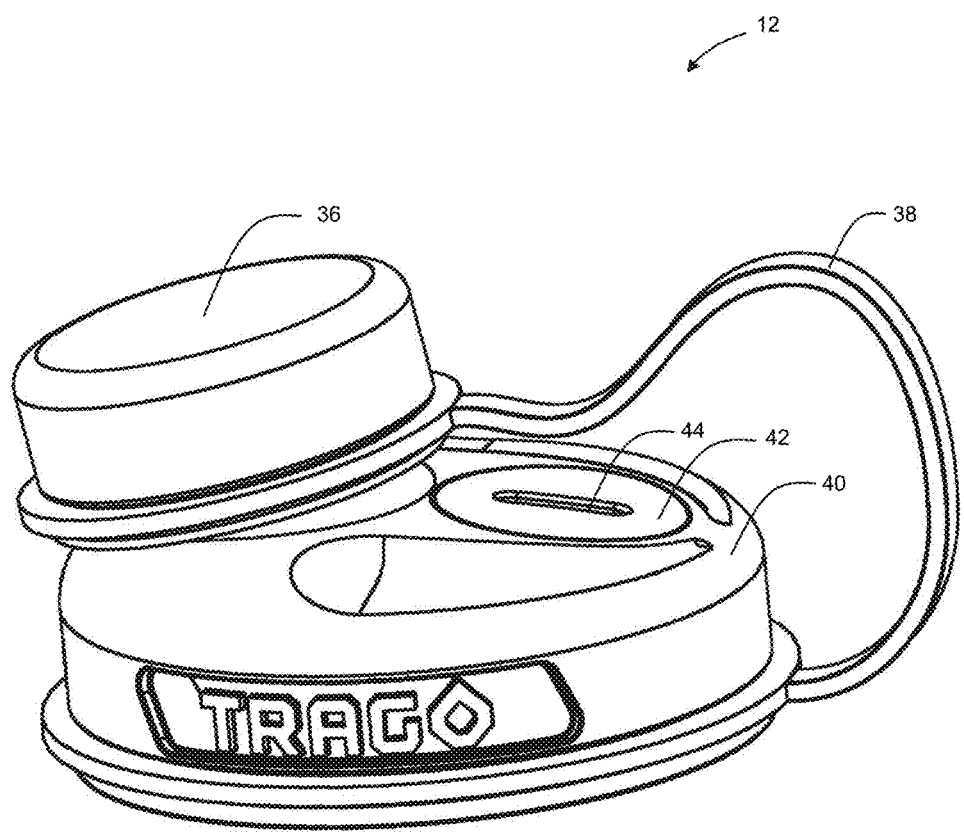
FIG. 2 is a top perspective view of a lid of the liquid dispenser of FIG. 1.

FIG. 2 shows a perspective exterior view of the lid 12. In some embodiments, the lid 12 may be generally manufactured from a relatively tough, electromagnetically transparent or translucent, food-grade plastic, such as nylon or polyethylene. In the illustrated embodiment, the lid 12 includes a removable sub-lid 36, a resilient lid strap 38, a lid housing 40, and battery lid 42. In some embodiments, the sub-lid 36 may be threaded to the housing 40 to seal a passage through which liquid is dispensed, and the resilient lid strap 38 may retain the sub-lid 36 to the housing 40, while being flexible enough to permit removal of the sub-lid 36. In some embodiments, the battery lid 42 may be threaded to the housing 40 and retain a battery inside the housing 40. In some embodiments, the battery lid 42 includes a slit 44 sized to receive a coin or screwdriver to unscrew the battery lid 42.

Figure 3:
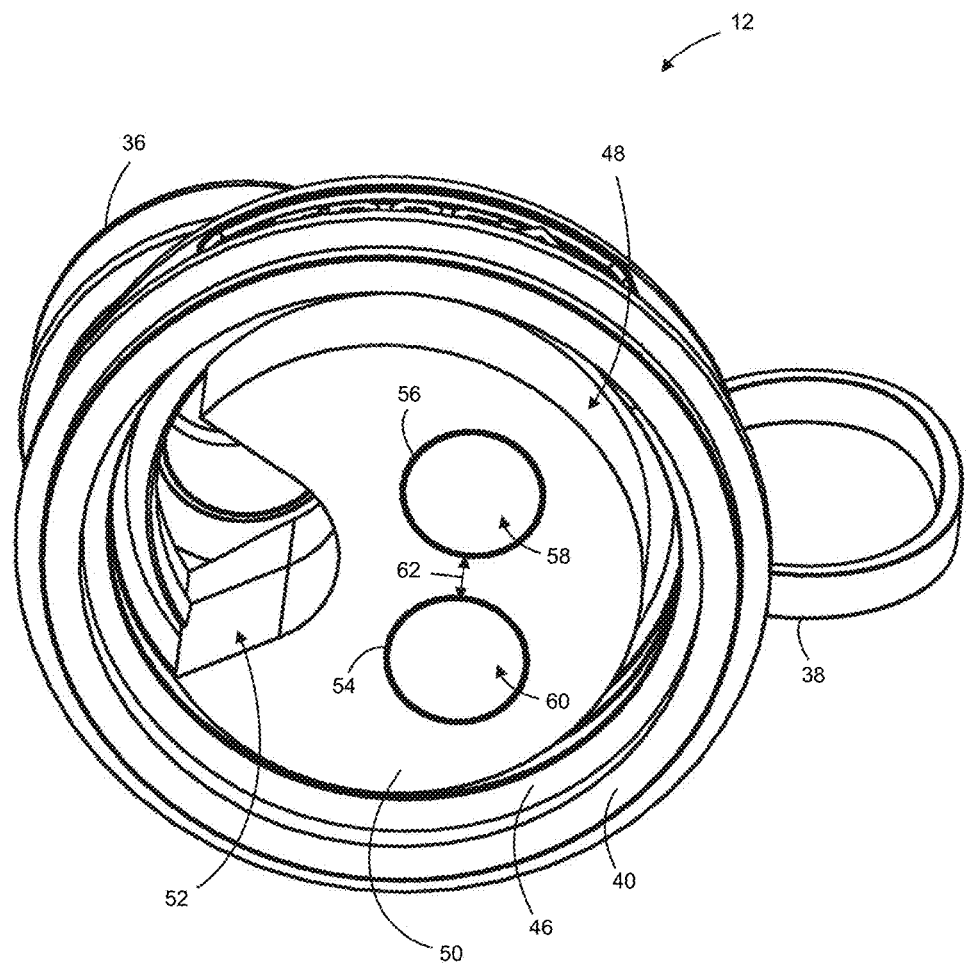
FIG. 3 is a bottom perspective view of the lid of FIG. 2.

FIG. 3 shows a bottom perspective view of the lid 12. As illustrated, the housing 40 may include threads 46 shaped to couple the lid 12 to the threads 32 of the bottle 14. A generally circular tubular recess 48 may receive the sidewalls of the opening 30, and an electronics case 50 of the housing 40 may house electronics of the lid 12. The housing 40 further defines a passageway 52, shown obstructed by the sub-lid 36. When dispensing liquid, the sub lid 36 may be removed, and liquid may pass from the interior volume 28 of the bottle 14 through the passageway 52, and out of the liquid dispenser 10.

In the illustrated embodiment, the electronics case 50 includes two generally circular apertures 54 and 56 that expose an ultrasonic transmitter 58 and an ultrasonic receiver 60 of the ultrasonic liquid level sensor 18. In some embodiments, the apertures 54 and 56 may be omitted, which is not to suggest that other features described herein may not also be omitted, and the transmitter 58 and receiver 60 may transmit and receive sound waves through the electronics case 50, thereby further shielding the electronics from potential harmful effects from liquids in the container 10, at the expense of potentially more attenuated ultrasonic signals. To mitigate this attenuation, some embodiments may include an acoustic matching layer between the electronics housing 50 and the transmitter 58 and the receiver 60 to reduce acoustic impedance.

As noted above, the distance 20 to the surface 22 of the liquid 16 may be relatively short compared to many industrial applications for ultrasonic liquid level sensors. As a result, an echo of an ultrasonic burst from the transmitter 58 may be received by the receiver 60 relatively soon after the burst. This short duration of time is expected to make it difficult to accurately measure liquid levels with an ultrasonic liquid level sensor that consolidates the transmitter 58 and the receiver 60 into a single transducer, such as a single piezoelectric crystal. Often, after an ultrasonic burst, a transmitter will continue to vibrate until the vibrations attenuate. These post, transmission vibrations may interfere with the receipt and sensing of an echo if the vibrations have not sufficiently attenuated by the time the echo is received. Separating the receiver 60 from the transmitter 58 is expected to mitigate this issue. In some cases, the receiver 68 may be mechanically separated from the receiver 58 by a material and shape 64 configured to dampen vibrations from the transmitter 58, and reduce the effect of vibrations passing through the electronics case 50 to the receiver 60.

In other embodiments, the transmitter 58 and receiver 60 may be consolidated into a single transducer, such as a single piezoelectric crystal. Some embodiments may actively dampen the transmitter after a burst, for example, by driving the transmitter with an alternating current 180° out of phase relative to the post burst vibrations to be dampened.

The illustrated embodiment includes a single ultrasonic receiver 60. But some embodiments may include multiple receivers, e.g., in spaced relation in an array of receivers. Such embodiments may compare the time at which a given echo is received by each of the receivers to infer a location of the surface of the liquid under loose ice.

A variety of different types of ultrasonic transmitters 58 and receivers 60 may be used. In some embodiments, the transmitter 58 and the receiver 60 may be piezoelectric crystals shaped to either drive an ultrasonic waves directionally toward a bottom of the container 14 (e.g., when driven by an alternating current power source at a resonant frequency of the crystal) or receive an echo from a surface of the liquid 16 and generate a current corresponding to receive vibrations. In some embodiments, a cone may be positioned around one or both of the transmitter 58 and the receiver 60 to concentrate and direct such sound waves. In some embodiments, other types of transducers may be used, e.g., a capacitive transducer. Further, some embodiments may use other types of liquid level sensors, such as resistive sensors, capacitive sensors, or weight sensors. In some embodiments, a cylindrical probe may extend downward from the cap 12 into the volume 28, e.g., approximately to the bottom of the bottle 14. In some cases, the presence of liquid may change capacitive properties of the probe along lengths of the probe that correspond to the liquid level. Some embodiments may measure the capacitance of the probe, e.g., by detecting a resonant frequency of a circuit including the probe, or by measuring a capacitive constant of the probe by accumulating a charge with the probe. In other embodiments, other properties may be sensed at different depths, e.g., an optical sensor include an array of optical fibers terminating at differing depths along the probe, and changes in optical properties accompanying the presence of a liquid may indicate the liquid depth. In another example, a resistance of the probe may be measured, e.g., by driving a current through the liquid via the probe.

Ultrasonic sound waves are expected to yield better results than audible sound waves in some applications. Users may find an audible chirp to be annoying and distracting, and ultrasonic sound waves tend to be more directional than audible sound waves, thereby tending to enhance the signal strength of echoes. That said, embodiments are also consistent with audible level sensors. In some embodiments, the transmitter 58 may be configured to transmit ultrasonic sound waves between 20 kHz and 120 kHz in frequency. In some cases, the transmitter 58 and receiver 60 may have a resonant frequency for vibrations in a direction normal to the surfaces of transmitter 58 and receiver 60 facing the interior volume 28 that corresponds to, for example, matches, the frequency of ultrasonic sound used. In some cases, the ultrasonic frequency may be selected with an eye towards trade-offs between signal dampening and signal directionality. Lower frequency signals are expected to be generally subject to less signal dampening than higher frequency signals, however, higher frequency signals are expected to tend to have more concentrated directionality than lower frequency signals, thereby facilitating more efficient use of power. In view of these trade-offs, some embodiments may operate with ultrasonic sound waves between 35 and 45 kHz in frequency, for example, at approximately 40 kHz.

Figure 4:
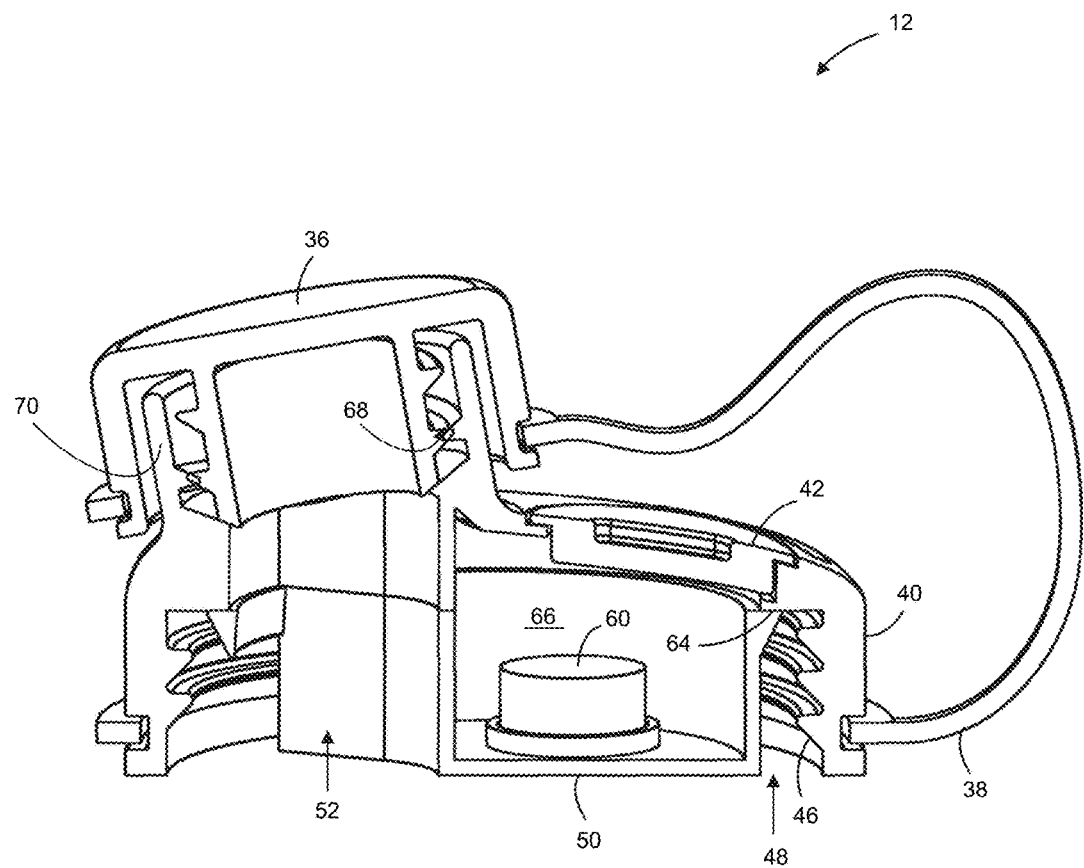
FIG. 4 is a cross-sectional perspective view of the lid of FIG. 2.

FIG. 4 is a perspective sectional view of the lid 12 showing additional detail. In some embodiments, the electronics housing 50 may be ultrasonically welded to the lid 40 at an interface 64 to define a volume 66 that is generally sealed from the interior of the bottle 14 and the outside world when the battery cover 42 is in place. As is also illustrated, the sub-lid 36 may be coupled with threads 68 to a cylindrical mouth 70 of the housing 40. In some embodiments, electronic components described with greater detail below may be disposed within the volume 66, including the illustrated transmitter 58 and receiver 60.

Some embodiments may include other spout designs. Some embodiments may include a straw-shaped spout, e.g., a removable straw or an integrally formed straw-shaped spout. In some cases, the spout may include a liquid sensor (e.g., a water contact sensor, like a conductive water sensor, a capacitive water sensor, or the like). In some embodiments, the water sensor may send an interrupt (or other signal) to the processor, which may process the signal as indicating the user dispensed liquid, triggering a liquid level measurement. In some cases, the straw may have a smallest diameter of between 3 and 15 millimeters and a generally circular cylindrical shape alone some length. In some cases, the straw extends to the near (e.g., within 2-3 cm) of the bottom of the bottle, or in some cases, the straw terminates closer to the lid. In some embodiments, the bottle is a squeeze bottle (e.g., a bottle having compressible resilient sides that deform in response to lateral compressive forces), in which case a liquid sensor in the spout may be more reliable than gestures for sensing dispensing of liquid in some cases.

Figure 5:
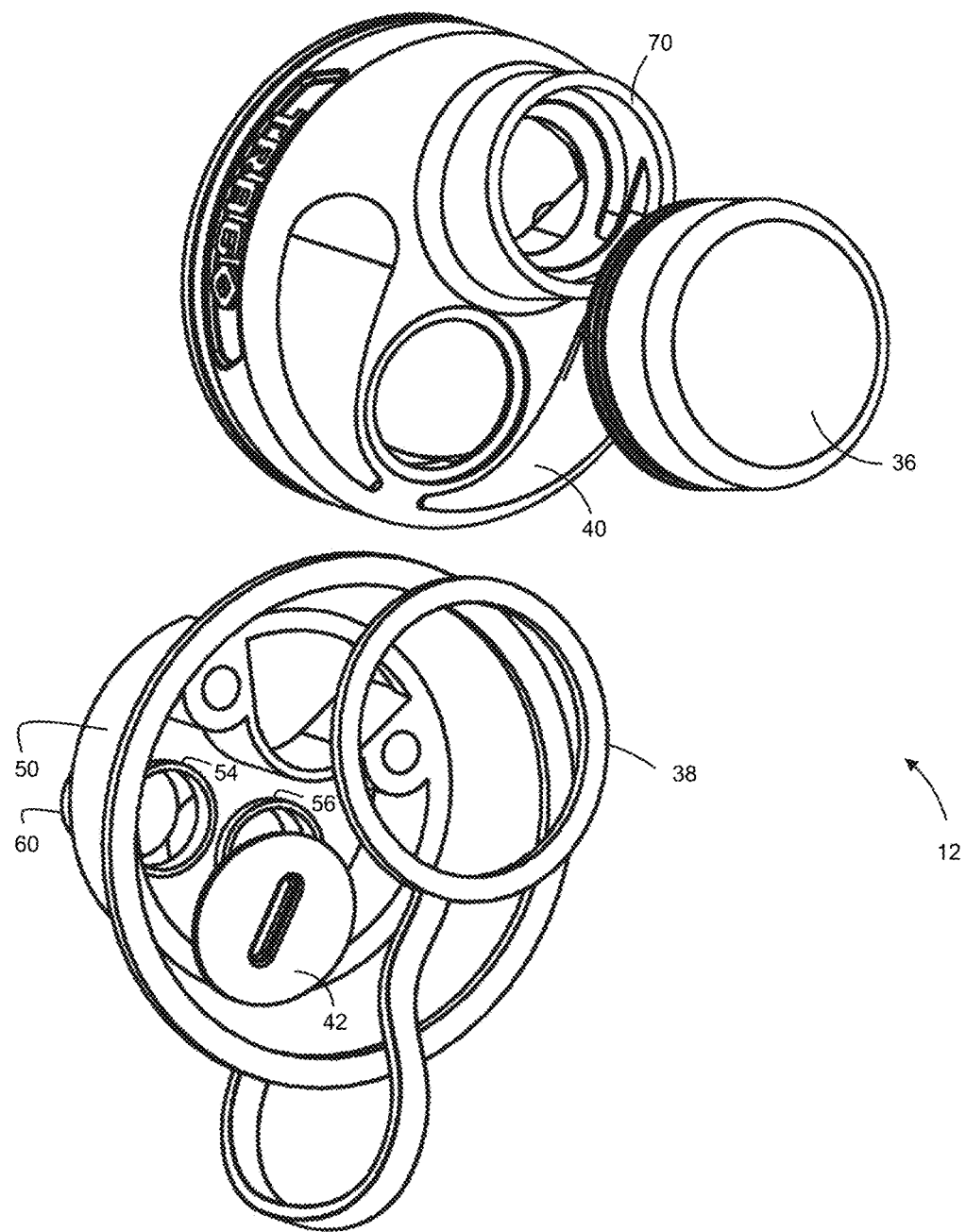
FIG. 5 is a top perspective exploded view of the lid of FIG. 2.
Figure 6:
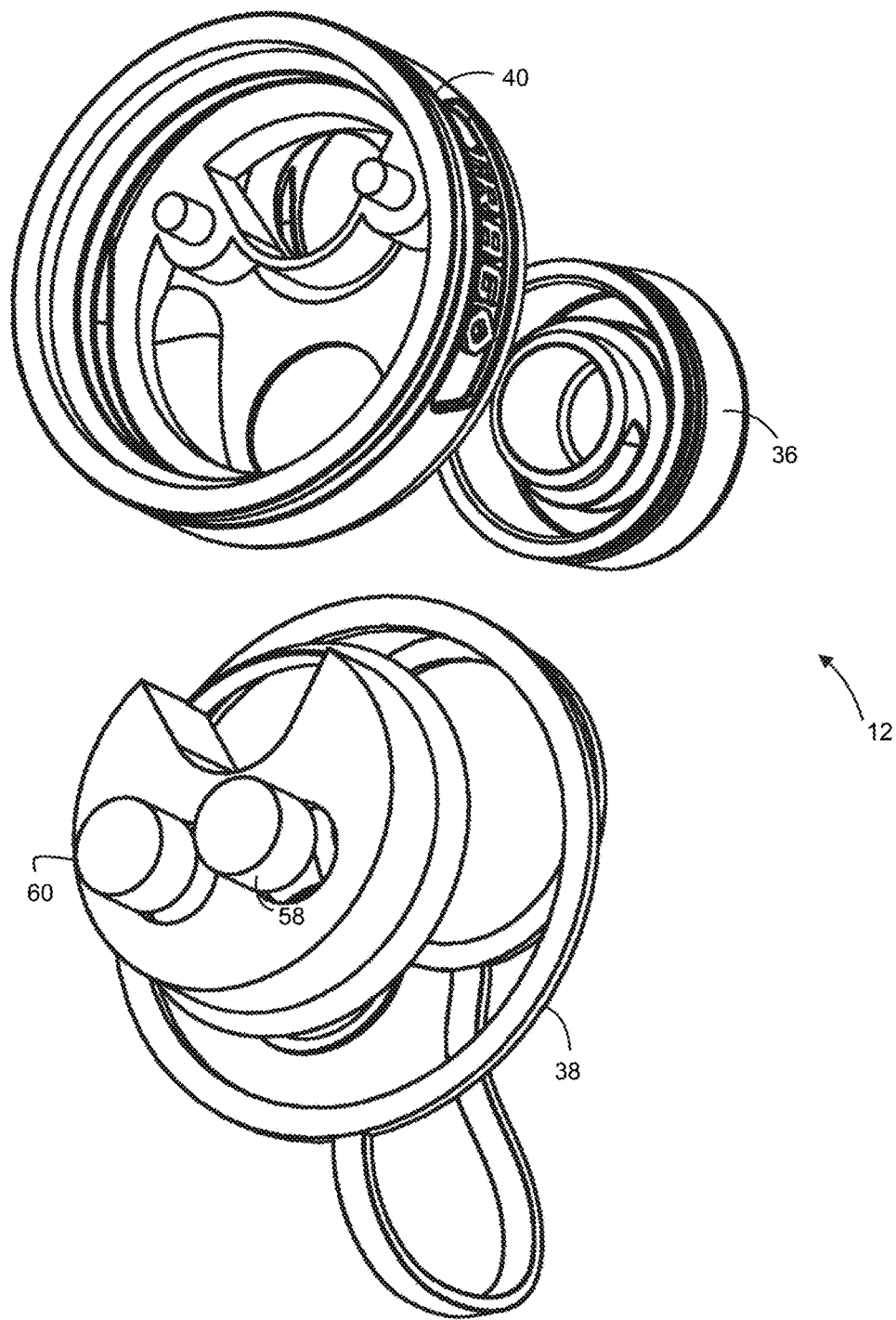
FIG. 6 is a bottom perspective exploded view of the lid of FIG. 2.

FIGS. 5 and 6 are top and bottom, respectively, exploded perspective views of the lid 12 showing the features described above in additional detail.

Figure 7:
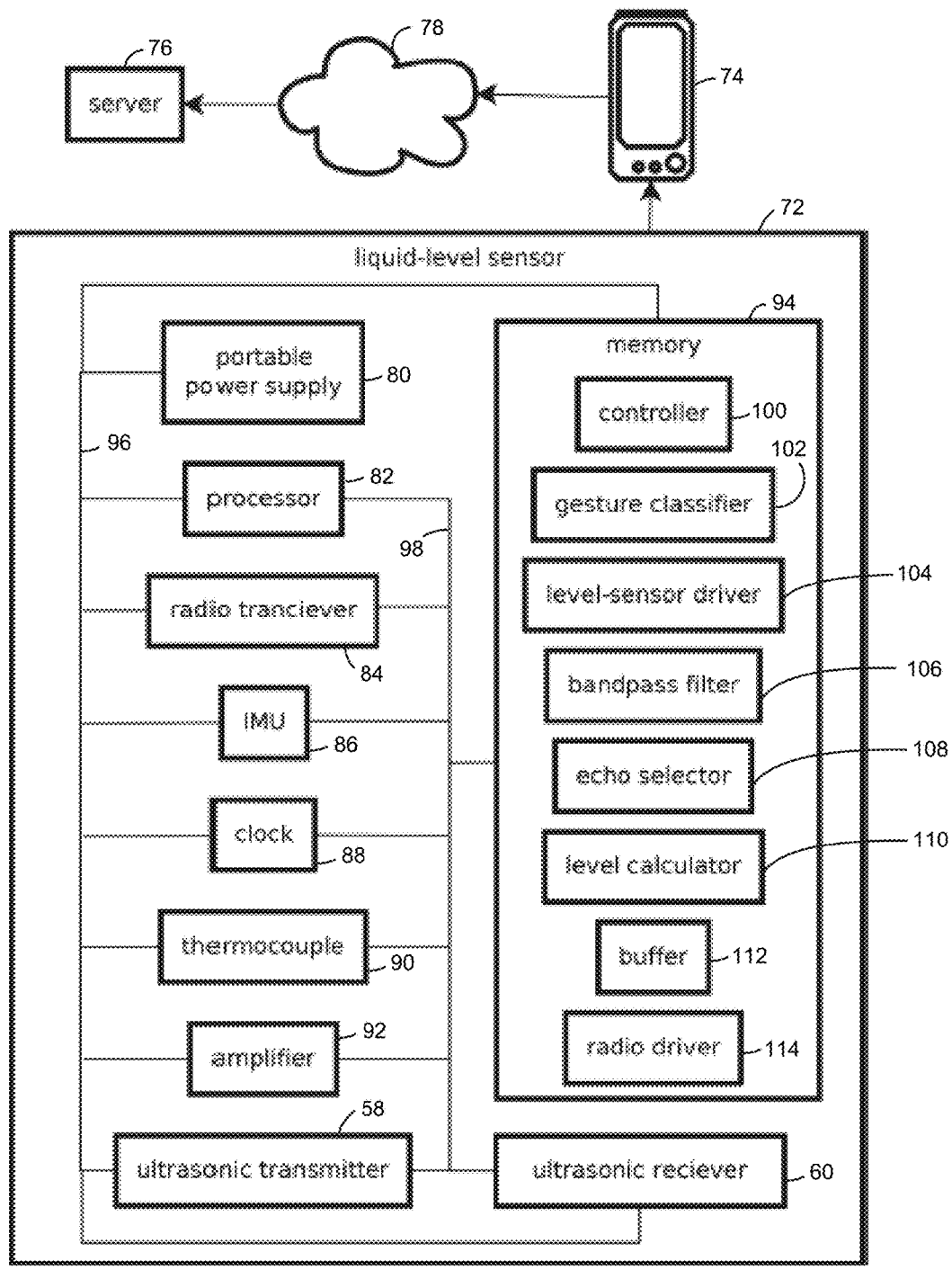
FIG. 7 is a block diagram of electronic components of the lid of FIG. 2.

FIG. 7 is a block diagram illustrating electronic and software components of the lid 12 and a computing environment in which those electronic components may be used. In some embodiments, the volume 66 of the lid 12 may house a liquid-level sensor 72 that includes the ultrasonic transmitter 58 and the ultrasonic receiver 60. In some embodiments, the liquid-level sensor may be configured to wirelessly communicate with a mobile computing device (or other computing device having a wireless interface) 74, and the mobile computing device 74 may communicate with a remote server 76 via the Internet 78 and various other networks, such as via a cellular network that connects to the Internet 78 and to which the user of the mobile device 74 has a subscription providing wireless access via a cellular base station. In some embodiments, the mobile device 74 may be a cell phone or various other types of computing devices, such as a wireless access point, a laptop computer, a desktop computer, a set-top box computer, and in-car computer, a wearable computing device, and the like. In some embodiments, the server 76 and the mobile computing device 74 may include some or all of the features of the computing device described below with reference to FIG. 13.

In some embodiments, the liquid-level sensor 72 may include a portable power supply 80, a processor 82, a radio transceiver 84, and inertial measurement unit 86, a clock 88, a thermocouple 90, an amplifier 92, the ultrasonic transmitter 58, the ultrasonic receiver 60, and memory 94. In some cases, some or all of these components may be connected to one another via a printed circuit board sized to fit within the volume 66.

In some cases, the portable power supply may be a battery, such as a lithium ion battery. In some cases, users are expected to be relatively sensitive to the weight of the liquid dispenser 10, for example, when engaging in endurance sports or hiking. Accordingly, some embodiments may have a relatively small battery having a relatively small amount of power, of which some embodiments are configured to make careful use. In some cases, the battery is a replaceable battery, such as a 3.3 volt coin cell 2032 battery. Other embodiments may use other portable power supplies, such as a photovoltaic solar panel disposed on the surface of the bottle 14, a capacitor, or the like.

A variety of different processors 82 may be used. In some embodiments, the processor 82 is a microcontroller configured to execute the software modules stored on memory 94 described below. The processor 82 is said to be configured to, or operative to, perform a function in virtue of code by which those functions are implemented being stored in memory 94. In some cases, the processor 82 includes one or more special purpose processors, such as a digital signal processor operative to provide the filtering and signal processing functionality described below. In some embodiments, the processor 82 includes a system-on-a-chip having integrated memory 94 and various inputs for receiving signals from the other components described herein. The processor 82 and other components may receive power from a power bus 96 connected to the portable power supply 80. Further, the processor 82 may communicate with the other components via a data bus, such as a data bus 98 defined by various conductive traces pattern in one or more layers of a printed circuit board.

Some embodiments may include a radio transceiver 84 by which the liquid-level sensor 72 communicates with the mobile computing device 74. In some embodiments, the radio transceiver is a Bluetooth network interface or a Wi-Fi network interface. In some embodiments, the radio transceiver 84 includes a near field communication network interface. In some embodiments, the radio transceiver 84 is a Low Energy Bluetooth network interface selected to favor lower power consumption.

Some embodiments may include an inertial measurement unit 86 configured to sense acceleration of the liquid-level sensor in space. In some embodiments, the inertial measurement unit 86 includes a single axis accelerometer, such as a tilt sensor, that measures the orientation of the liquid level sensor 72 relative to gravity. Other embodiments may include more feature-rich sensors operative to detect more complex movements through space. In some cases, the inertial measurement unit 86 includes a six axis accelerometer configured to detect acceleration up and down, forward and backward, and to the side, and having gyroscopic sensors, configured to detect angular acceleration about each of these axes. In some cases, the inertial measurement unit 86 may be configured to transmit a signal to the processor 82 indicating magnitude and direction of accelerations. Detecting orientation and accelerations is expected to help conserve power, as some embodiments may enter a low-power sleep mode between periods in which such accelerations are detected. Further, measuring orientation relative to gravity is expected to yield more accurate measurements of fluid levels, as some embodiments may determine whether the liquid dispenser 10 is oriented vertically before taking a measurement.

In some embodiments, the clock 88 may be a crystal configured to vibrate at a natural frequency when supplied with power, and the vibrations of the crystal may yield a periodic clock signal that may be used by the other components to synchronize operations and time flight time of sound waves and resultant echoes to calculate distances to the surface of the liquid 16. Some embodiments may count a number of clock cycles between a burst of ultrasonic sound and receipt of the corresponding echo to calculate such distances.

Some embodiments may include a temperature sensor, such as thermocouple 90, to measure the temperature of air in the volume 28 of the bottle 14. Sound waves travel at different speeds depending upon the temperature of air, and some embodiments may adjust calculated distances based on the measured temperature to account for this effect. In some cases, the thermocouple may include a probe positioned to be in thermal communication with the volume 28.

Some embodiments may further include an amplifier 92 configured to amplify signals sensed by the ultrasonic receiver 60 for subsequent processing by the processor 82. In some cases, the amplifier 92 may be integrated with the ultrasonic receiver and the ultrasonic transmitter as a single component, which is not to suggest that the other components described herein are necessarily discrete.

Some embodiments may further include memory 94. In some cases, memory 94 includes persistent memory, such as flash memory, that retains data even in the absence of power. In some embodiments, memory 94 may be integrated with the processor 82 on a single chip, or the memory 94 may be a discrete component coupled to the processor 82. The illustrated memory 94 is shown storing instructions for a variety of functional blocks described with greater detail below. This functionality may be implemented in software or hardware, with various trade-offs between cost and flexibility. In some cases, the memory 94 is a tangible, non-transitory, machine-readable medium storing instructions that when executed effectuate the functionality described herein. In some embodiments, the memory 94 includes a controller 100, a gesture classifier 102, a level-sensor driver 104, a bandpass filter 106, an echo selector 108, a level calculator 110, a buffer 112, and a radio driver 114.

In some embodiments, the controller 100 may coordinate the operation of the other hardware and software components, for example, executing the processes described below with reference to FIGS. 8, 9, and 10 with cooperation of the other components. In some cases, the controller 100 may include a plurality of event handlers configured to respond to various interrupts sent by the other components on the data bus, for example, indicating receipt of radio signals, detection of movement, and received echoes.

In some embodiments, the gesture classifier 102 may receive signals indicative of acceleration from the inertial measurement unit 86 and determine whether to disregard the signals as indicating, for example, that the user is walking or running, or recognize the signals as gestures corresponding to events that change liquid levels. For example, some embodiments may receive signals indicative of accelerations and determine whether the signals indicate repeated accelerations with a periodic signal and whether those repeated accelerations fall within a threshold range of frequencies corresponding to walking or running. In some cases, accelerations may be disregarded until the gesture classifier 102 determines that no or relatively small (such as less than a threshold amount) of accelerations have been received over some duration of time, indicating that the bottle has been placed at rest, to avoid taking measurements when, for example, the bottle is undergoing acceleration while driving in a car.

In some cases, they gesture classifier 102 may be configured to detect gestures associated with taking a drink and removing the lid 12 to add liquid to the bottle 14. For example, the gesture classifier 102 may determine whether signals from the inertial measurement unit 86 indicate a particular sequence of accelerations have occurred with larger than threshold magnitude over longer than threshold durations. Some embodiments may determine that the bottle has been accelerated upward, then rotated about an axis in the horizontal plane, then rotated backward about the axis, then accelerated downward, before being brought to rest. In response to this determination, some embodiments may determine that a user likely took a drink and initiate a reading of the liquid level in response to identify when the liquid was dispensed and the amount of liquid dispensed. In another example, some embodiments may determine that an angular acceleration occurred of sufficient duration and magnitude specified by threshold values in a first direction and then in an opposite direction, indicating that the lid 12 was unscrewed from the bottle 14 and screwed back in place. Upon detecting such a gesture, the gesture classifier 102 may output a bottle open event that causes the controller 100 to take a reading to determine whether liquid was added to the bottle 14 and when that liquid was added. In some cases, bottle opening may be detected with other techniques, e.g., with a switch that is closed by threading the lid 12 to the bottle 14.

In some cases, the gesture classifier 102 may integrate accelerations over time to calculate velocities over time, and integrate those velocities over time to calculate a path and orientation of the bottle 14 in space over time, e.g., between periods at which the bottle 14 is deemed to be at rest. These paths and orientations may be classified as gestures indicating the user took a drink (causing a drink event to be identified), in some embodiments, with, for example, a neural net classifier trained on a training set of labeled IMU readings.

In some embodiments, the level-sensor driver 104 may receive readings from the inertial measurement unit 86 indicating the orientation of the bottle 14 relative to the direction of gravity and determine whether the bottle 14 is oriented in a vertical position, such that the fluid 16 resides opposite the lid 12 when at rest in the bottle 14. In some cases, the level-sensor driver 104 may receive a signal indicating a difference in angle between vertical (relative to gravity) and the orientation of the bottle 14 and determine whether the difference in angle is greater than a threshold amount. In some embodiments, the threshold angle may be approximately 15°, corresponding to a beam angle of the ultrasonic transmitter 58.

Some embodiments may include a bandpass filter 106 that selectively passes a range of frequencies sense by the ultrasonic receiver 60 to other components executed by the processor 82 for subsequent processing. In some embodiments, the bandpass filter 106 is implemented with analog components, or some embodiments may implement the bandpass filter 106 in a digital signal processor. In some cases, the bandpass filter may selectively pass frequencies approximately equal to those transmitted by the ultrasonic transmitter 58 to mitigate the effects of noise perceived by the receiver 60.

In some embodiments, after a burst of ultrasonic sound is transmitted by the transmitter 58, the receiver 60 may receive a plurality of echoes, for instance, corresponding to the surface of the liquid 22 and the bottom of the container 14, as well as soundwaves that are reverberating back and forth within the container 14. These may be received by the ultrasonic receiver 60 as a series of echoes occurring over time. In some embodiments, the echo selector 108 may be configured to select among these plurality of echoes to identify the echo corresponding to the first echo from the surface 22 of the liquid 16. In some cases, the echo selector 108 may rank the echoes by the amplitude of the echo and select the echo having the highest amplitude. The time at which the selected echo was received may be used to calculate the level of the liquid.

Some embodiments may further include a level calculator 110 that may use a difference between the time of the selected echo and the time at which the ultrasonic transmitter transmitted a burst 58 to calculate the level of the liquid. In some cases, level calculator may count a number of clock cycles measured by clock 88 between when the ultrasonic transmitter 58 transmitted a burst and when the selected echo was received by the ultrasonic receiver 60. The level calculator 110 may further be configured to account for changes in the speed of sound in air associated with different temperatures measured by the thermocouple 90. For instance, for a given duration of time before and echo is received, the level calculator 100 may calculate a shorter distance in response to a higher measured temperature, and vice versa.

In some embodiments, the calculated levels (e.g., distances, or changes between distances) may be associated with timestamps (indicating the time at which a measurement was taken) and stored in buffer memory 112. In some cases, users may carry the liquid dispenser 10 while not in the presence of a mobile device, for example, on a hike or while engaging and exercise. The measured, timestamped levels may be stored in buffer 112 for conveyance to the device 74 when a connection is reestablished. In some cases, the buffer 112 may store a plurality of liquid level of events, each liquid level event having a timestamp at which the measurement was taken, a level of the liquid, a temperature measured by the thermocouple 90, and in some cases an indication of the cause of the measurement, for example, whether a particular gesture was detected.

As noted above, some embodiments may offload analysis and display functionality to the mobile device 74 to conserve power in the liquid dispenser 10. For instance, in some cases, a user may specify the horizontal cross sectional area of the bottle 14 as a function of distance from the lid 12 when configuring a tracking application executing on the device 74, such as a hydration tracking application described below. In some cases, when configuring the application, a user may enter a model and maker of a bottle, and some embodiments may retrieve data describing the area as a function of distance. Or in some cases, a user may calibrate the lid 12 to a given bottle, for instance, by entering a calibration mode with the device 74 and repeatedly adding a fixed amount of liquid, like one cup, to the bottle and then instructing the lid 12 to measure a distance to the surface of the liquid with the application. (In some cases, the tracking application may be configured to send instructions to the lid 12 that, when received, cause the lid 12 to measure the distance 20.) In some embodiments, the tracking application may subtract the distance 20 from a total distance to the bottom of the volume 28 (extending in the same direction) to calculate a height of the surface of the liquid above the volume. Some embodiments may calculate a current volume of stored liquid by integrating the horizontal area function specific to the bottle over the height, from the bottom of the volume 28 to the surface of the liquid. In some cases, the hydration metrics may be tracked on the lid 12, and a display, such as a light emitting diode, may indicate the adequacy of a user's hydration.

Some embodiments may further include a radio driver 114 operative to control the radio transceiver 84 at the direction of controller 100. In some cases, the radio driver 114 may cause the radio transceiver 84 to periodically transmit a beacon (e.g., without regard to whether other devices are in range) indicating the capabilities of the liquid level sensor 72 to wireless devices that happen to be in range. For instance, some embodiments may transmit this beacon every 100 ms. In some cases, the beacon may be transmitted within a range of less than 50 to 100 m to limit power consumption. Some embodiments may drive the radio transceiver 84 into a sleep state to conserve power between beacon transmissions, e.g., after sensing for connection-request signals over a duration of time in which another device is expected to request two-way communication after receiving the beacon. In some embodiments, a connection may be established with the radio transceiver 84 and a mobile device 74 after them mobile device 74 receives a beacon and requests to establish this connection. In some cases, the connection may be a Low-Energy Bluetooth connection or a Wi-Fi connection.

Figure 8:
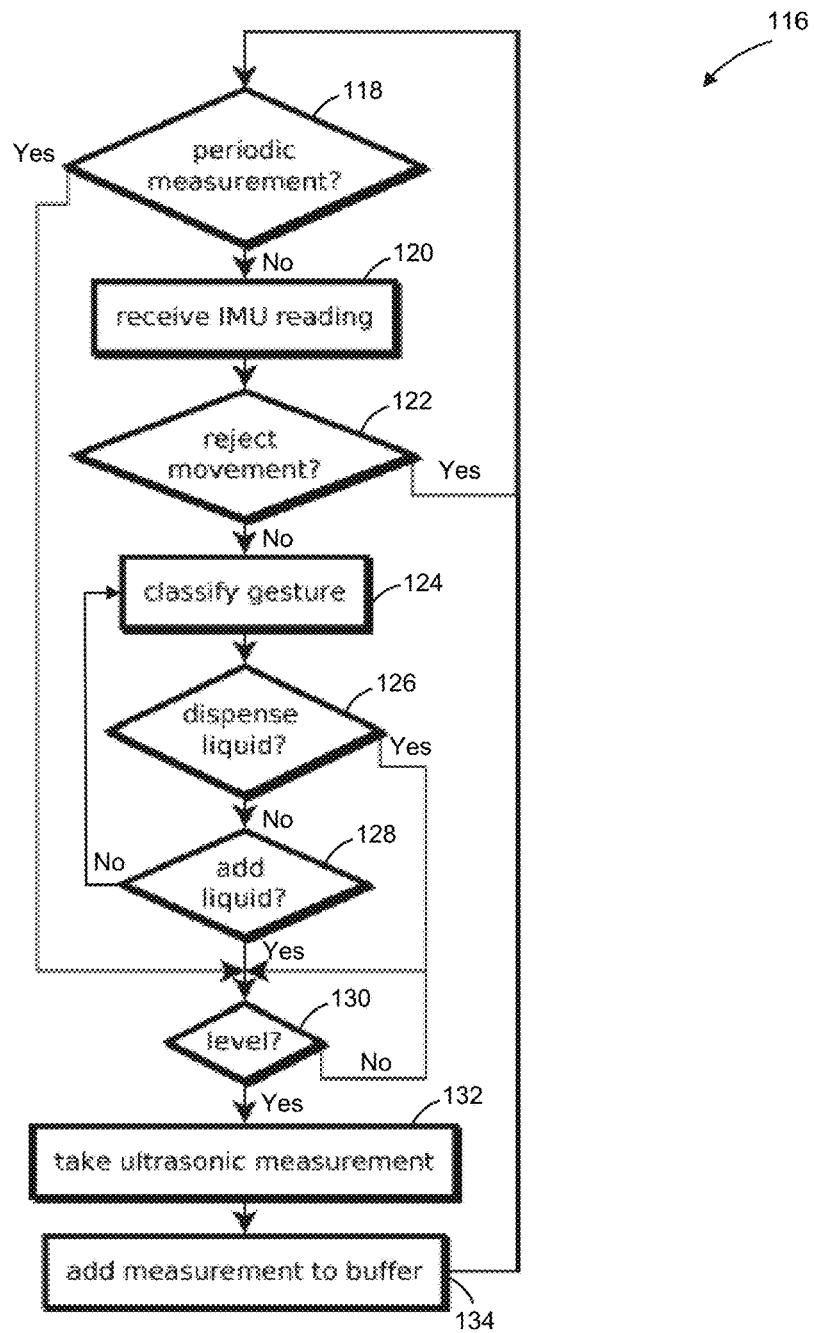
FIG. 8 is a liquid level tracking process performed by some embodiments of the lid of FIG. 2.

FIG. 8 shows an example of a process 116 they may be performed by some embodiments of the liquid level sensor 72 described above. In some embodiments, the process 116 determines whether a duration of time has elapsed corresponding to a periodic measurement of liquid level, as indicated by block 118. Some embodiments may take a liquid level measurement every 30 seconds, assuming the bottle is oriented vertically (relative to perceived gravity), to balance between the risk of low-temporal-resolution consumption measurements and excessive battery consumption. Upon determining that the time for a periodic measurement has arisen, some embodiments may proceed to determine whether the container is level as described below. If the time is not present for a periodic measurement, some embodiments may monitor for inertial measurement unit readings, and receive such a reading, as indicated by block 120. In response to receiving a reading (e.g., signal indicating a direction and magnitude of acceleration), some embodiments may determine whether to reject the movement, for example, as indicating that the user is walking, or driving, with the bottle, as indicated by block 122.

If the movement is not rejected, in response, some embodiments may attempt to classify a gesture, as indicated by block 124, e.g., using the techniques described above. Some embodiments may determine based on the classified gesture whether the user is dispensing a liquid, as indicated by block 126, or adding liquid, as indicated by block 128. Some embodiments may continue to classify the gesture until the user has completed movement or the gesture is classified. Some gestures may remain unclassified (not shown), and the process may return to block 118, for example, after a timeout occurs after a duration of time in which a user would be expected to have completed an instance of dispensing the liquid. Some embodiments may use other techniques to determine that the user has dispensed liquid. For instance, some embodiments may include switches on opposing sides of the lid 12, such switches that are biased in an open state when the lid 12 is untouched, so that a user can close the switches, indicating consumption, in a movement consistent with dispensing liquid. In some cases, the housing 40 may include an integrally formed deformable member cantilevered radially outward, with contacts sitting between the member and the housing 40, such that the cantilevered member is deformed and the contacts close a circuit coupled to processor 82 when a user wishes to indicate they are dispensing liquid. Such switches are expected to be less intuitive to users than accelerometer based detection but less expensive in some cases.

Further, in some cases, the lid 12 may include a selector switch (e.g., a two way selector switch) by which a user may identify a user profile of the user dispensing or adding liquid. The switch may open or close a circuit connected to processor 100, indicating a state of the switch. Often, two people will share a bottle. By switching the selector, users may indicate which user consumed or added liquid. In some cases, an identifier of the user may be associated with corresponding liquid level events in the buffer 112, and the mobile device 74 may group the events by the indicated position of the switch, such that consumption by different users may be tracked. In some cases, multiple mobile devices 74 may communicate wirelessly with the liquid dispenser 10. In some embodiments, a first mobile device may be selectively sent those events in the buffer 112 corresponding to a selector switch state in a first position, and a second, different mobile device may be selectively sent other events in the buffer 112 corresponding to a different selector switch state. In some cases, other techniques may be used to identify and distinguish between users, e.g., wirelessly transmitted identifier from a wearable computing device, such as a Low-Energy Bluetooth beacon emitted by a smart watch, or a near-field communication signal with a user identifier from a ring with an NFC chip.

After determining that either a periodic measurement is to be performed, that user has dispensed liquid, or the user has added liquid, some embodiments may determine whether the container is level, as indicated by block 130. As noted above, this determination may include determining whether the container is oriented with respect to gravity within some threshold angle, for instance within 15° of the direction gravity as perceived by IMU 86. In other cases, a switch or strain gauge on the bottom of bottle 114 may send a signal indicating that the bottle 14 is resting on a surface, though this technique is expected to be less reliable, e.g., when a bottle is compressed in a gym bag.

Next, some embodiments may take an ultrasonic measurement, as indicated by block 132 and add the measurement to a buffer, as indicated by block 134, before continuing to monitor for subsequent measurement events. To conserve power, in some embodiments, the processor 82 and other components may enter a sleep state between events. In some cases, the IMU 86 may measure accelerations with a lower frequency and granularity while in the sleep state, and in response to detecting an acceleration, velocity, or position change greater than a threshold, the processor 82 may wake up from the sleep state and instruct the IMU 86 to increase the sampling rate for more precise gesture identification. Or some embodiments may operate at the same sampling rate for the IMU 86 to facilitate use of less expensive and simpler electronics at the expense of potentially higher power consumption.

Figure 9:
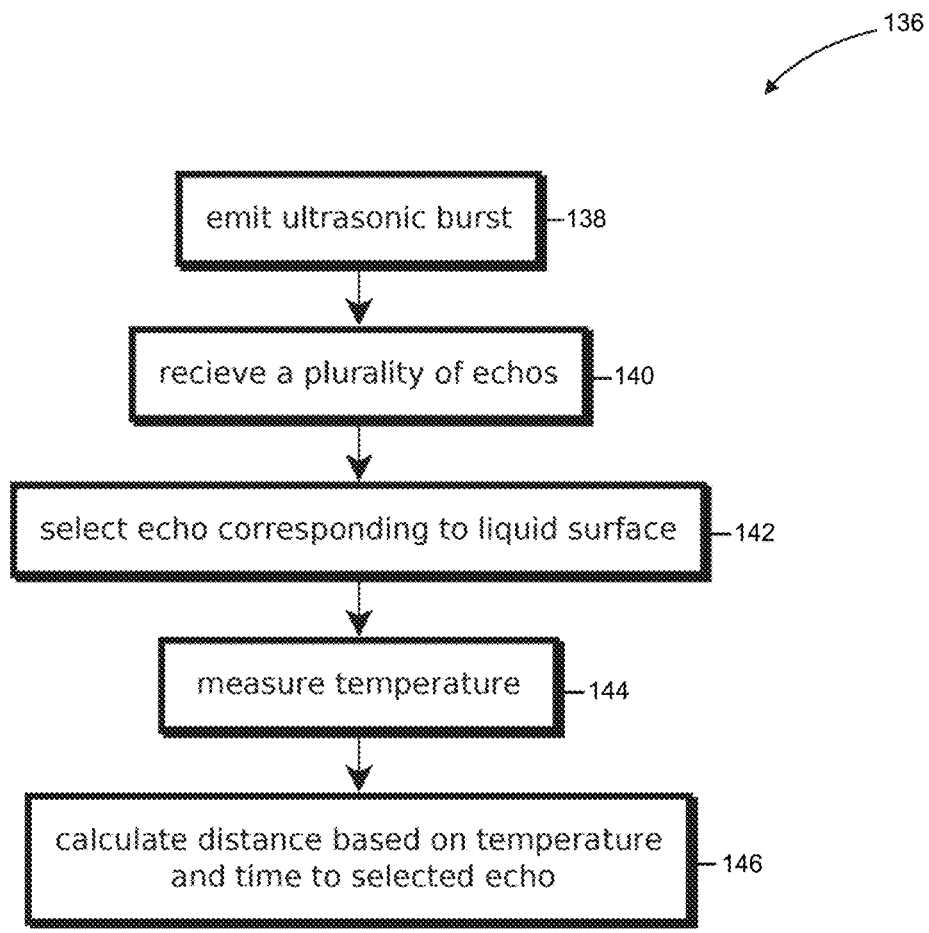
FIG. 9 is an ultrasonic measurement process performed by some embodiments of the lid of FIG. 2.

FIG. 9 shows an example of a process to take an ultrasonic measurement 136. In some cases, the process 136 may be preceded by an instruction to an ultrasonic transmitter to transmit or vibrate for some warm-up duration of time, for example, for 3 ms. Next, some embodiments may emit an ultrasonic burst. In some cases, the ultrasonic burst may be on the order of 1 ms or less, for instance, less than 0.1 ms. Next, some embodiments may receive a plurality of echoes, as indicated by block 140, as the ultrasonic burst echoes off of the surface of the liquid, the bottom of the container, the walls of the container, and the like.

Some embodiments may then select an echo corresponding to the surface of the liquid, as indicated by block 142. As noted above, the selection may be based on the echo having the highest amplitude. Amplitude may be calculated based on a root mean square value of a sensed wave during, for example, the strongest 50% of the wave as measured by peak intensity in each oscillation.

Next, some embodiments may measure a temperature of the air in the bottle, as indicated by block 144. In some cases, the temperature may be measured in advance of emitting the ultrasonic burst 138.

Some embodiments may then calculate a distance based on temperature and time to the selected echo, as indicated by block 146. The time may be a duration of time between when the ultrasonic burst is emitted and when the selected echo is received, e.g., when a leading edge of the echo exceeds a threshold amplitude. In some cases, a speed of sound in air at the measured temperature may be calculated, for instance, by retrieving a value from a lookup table or by applying inputs to a corresponding equation. This speed of sound may be multiplied by the duration of time until the echo to calculate the distance, and this distance may be divided by two to calculate a level of the fluid relative to the fluid level sensor. In some cases, the inputs to these calculations may be stored in buffer 112 in an associated event, and the values may be sent to mobile device 74 to offload the calculations and conserve power.

In some embodiments, a plurality of measurements may be taken for a given liquid-level measurement event, and those plurality of measurements may be combined, for example, with a measure of central tendency, like a mean, median, or mode value of liquid level. Some embodiments may exclude from the aggregate calculation those measurements that are outside an expected range, e.g., distances more than one meter. In some cases, the plurality of measurements may be separated from one another in time by guard bands in which the ultrasonic level sensor is allowed to come to rest (or closer to rest) to prevent extraneous vibrations from preceding measurements from interfering with subsequent measurements.

Figure 10:
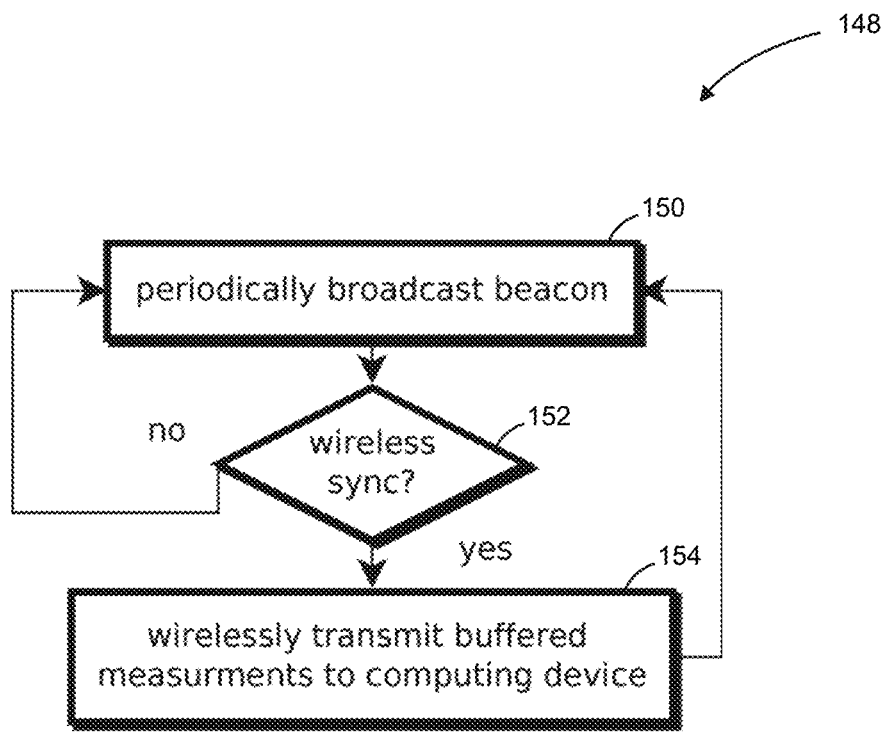
FIG. 10 is a wireless data transfer process performed by some embodiments of the lid of FIG. 2.

FIG. 10 shows an example of a process 148 for conveying buffered liquid level events to a remote mobile computing device, or other computing device. In some embodiments, the process 148 includes periodically broadcasting a wireless beacon, as indicated by block 150, such as a Low-Energy Bluetooth beacon. Next, some embodiments may determine whether the mobile computing device request to wirelessly sync with the liquid dispenser 10, as indicated by block 152, such as in a wirelessly transmitted sync request. After determining that a wireless sync is requested, some embodiments may establish a two-way wireless communication, such as a Bluetooth connection with the mobile computing device, and some embodiments may wirelessly transmit buffered measurements to the computing device, as indicated by block 154.

Figure 11:
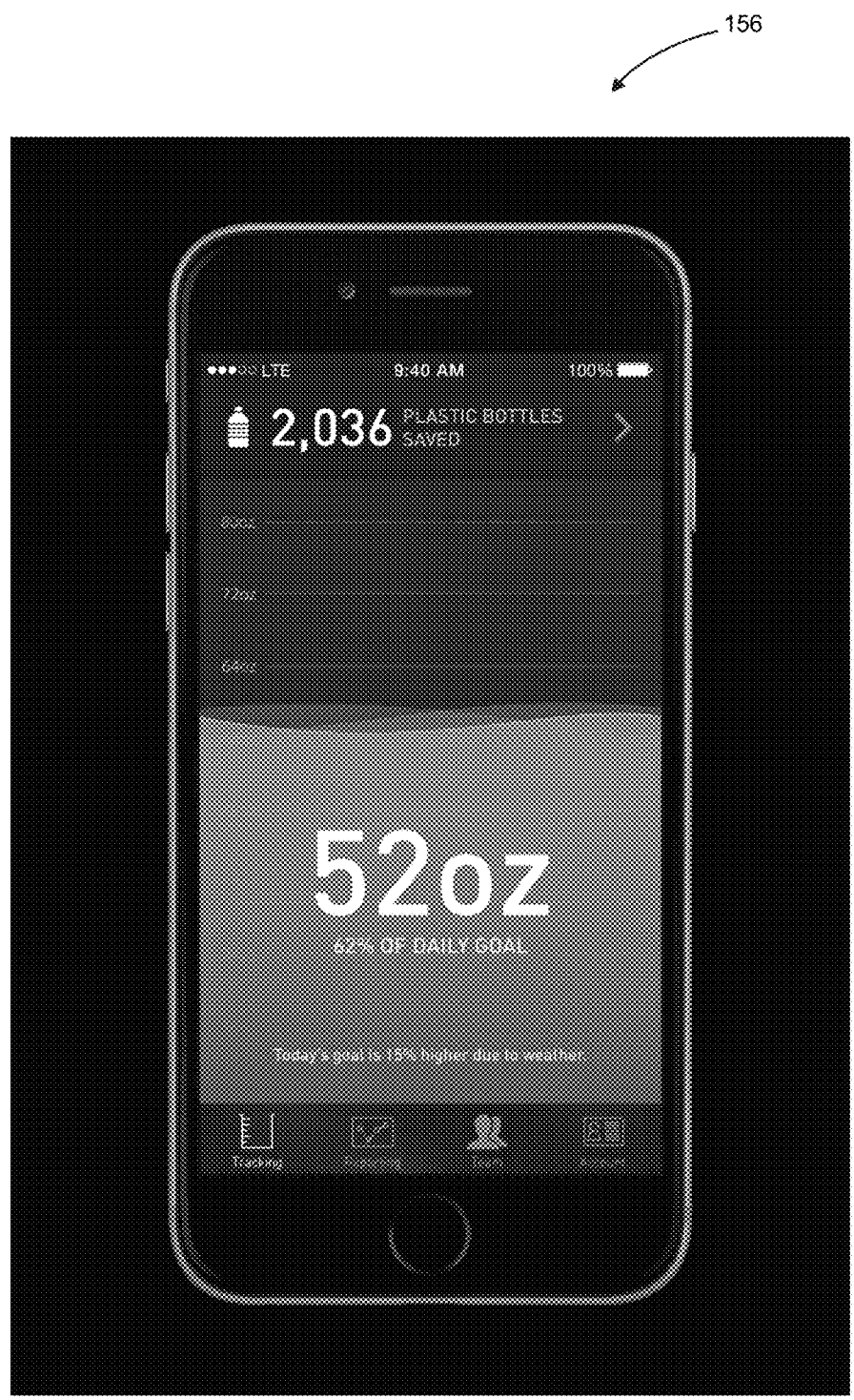
FIG. 11 is an example of a user interface of a hydration tracking application in communication with the lid of FIG. 2.
Figure 12:
FIG. 12 is another example of a user interface of a hydration tracking application in communication with the lid of FIG. 2.

The mobile computing device 74 may then perform some of the above-described offloaded calculations and cause the user to be alerted to relevant events. In some embodiments, the mobile computing device may execute a hydration tracking application that senses the broadcast beacon and requests and processes the received events. FIGS. 11 and 12 show examples of user interfaces displayed by an example hydration tracking application. In some embodiments, the hydration tracking application is a special purpose native application downloaded to the user's cell phone from a repository of such applications hosted on a remote server (e.g., one having the features described below with reference to FIG. 13) by a provider of an operating system of the user's cell phone.

In some embodiments, the hydration tracking application may track when and how much liquid a user has consumed and make recommendations and track metrics indicative of such consumption. For instance, some embodiments may also receive data from a fitness tracker indicative of an amount of physical exertion by a user and calculate recommended hydration based on measured events from the liquid dispenser 10, an amount of activity indicated by a fitness tracker, and a current temperature in the geolocation of the user, for instance, indicated by a remote weather service. In some cases, the hydration application may calculate a target amount of hydration and compare the target amount of hydration to a measured amount of hydration form the liquid dispenser 10. In response to determining that a difference between the target amount of hydration and a measured amount of a hydration exceeds a threshold, some embodiments may present an alert to the user, for example, a notification on a lock screen of the computing device. In some cases, an alert may be transmitted to a wearable device, such as a smart watch worn by a user during exercise.

In some embodiments, the mobile computing device may convey hydration events to a remote server (e.g., one having the features described below with reference to FIG. 13) by which a user may share their hydration record with other users, for example, with adjacent nodes in a social graph. In some embodiments, a sporting team may share hydration metrics with one another, and a coach operating an instance of the hydration application may track hydration of a plurality of athletes, for example, a team being coached. In some cases, the coach's hydration application may request hydration metrics for each of a plurality of athletes from the server, receive those metrics, and display a dashboard indicating hydration metrics for the athletes, for example, ranking the athletes based on a difference between a targeted hydration and a measured hydration amount.

Figure 13:
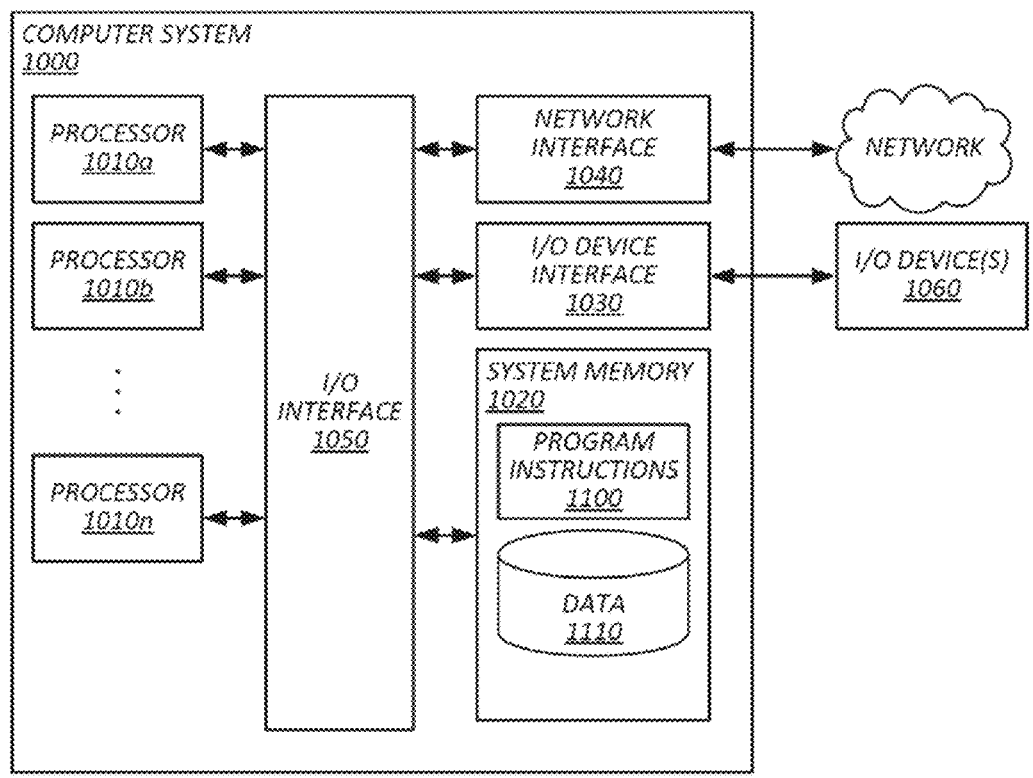
FIG. 13 is a computing device by which systems that communicate with the lid of FIG. 2 may be implemented.

FIG. 13 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:
1. A sensor operative to track changes in a liquid level of a hand-held liquid container, the sensor comprising: an ultrasonic liquid-level sensor configured to indicate a liquid level of a liquid in a hand-held liquid container, wherein the ultrasonic liquid-level sensor is capable of indicating the liquid level when the surface of the liquid is less than 20 centimeters away from the ultrasonic liquid-level sensor; a radio transmitter; and a processor configured to draw power from a portable power source, receive liquid-level indications from the ultrasonic liquid-level sensor, and cause the radio transmitter to transmit data indicative of changes in the liquid level.
2. The sensor of embodiment 1, comprising: a water bottle having a mouth with a threaded opening between 55 and 67 millimeters in diameter measured from an outer surface of a rim defining the opening and measured in a recess of the threading; a water bottle cap shaped to be threaded to the opening to close the mouth of the water bottle, the water bottle cap including the portable power supply, the ultrasonic liquid-level sensor, the radio transmitter, the processor, an accelerometer coupled to the processor, and an aperture positioned to dispense liquid from the water bottle when the water bottle is inverted, wherein: the water bottle defines a cavity of less than 2 liters in volume to store the liquid; the portable power supply comprises a battery coupled to the processor; the processor is operative to: receive signals indicative of acceleration from the accelerometer; determine that the water bottle is oriented within a threshold angle relative to a vertical orientation; in response to determining that the water bottle is oriented within the threshold angle relative to the vertical orientation and signals indicative of acceleration, cause the ultrasonic liquid-level sensor to sense the level of the liquid in the water bottle; the ultrasonic liquid-level sensor comprises: a transmitter having a piezoelectric transmitter operative to transmit sound waves at between 35 kHz and 45 kHz and oriented to direct the sound waves into the cavity; a receiver, separated from the transmitter in the water bottle cap by material configured to dampen vibrations passing through the cap from the transmitter to the receiver, and operative to generate an electrical signal indicative of the amplitude of sound waves impinging upon the receiver, including transmissions of the transmitter echoing off the surface of the liquid; wherein the sensor comprises: a band-pass filter operative to select electrical signals from the receiver within a range of frequencies; an echo selector operative to receive a plurality of echoes from the band pass filter and select an echo having a highest amplitude among the plurality of echoes as corresponding to an echo from the surface of the liquid; a clock operative to indicate a duration of time that elapses between a transmission of the transmitter and a receipt of a corresponding echo by the receiver; and a distance calculator operative to generate an indication of the liquid level based on the duration of time indicated by the clock; wherein the processor is configured to cause the radio to periodically broadcast a beacon indicative of functionality of the water bottle cap and establish two-way wireless communication with a computing device that wirelessly requests data indicative of the liquid level, wherein the data indicative of the liquid level comprises a plurality of time-stamped indications of the liquid level at different times.
3. The sensor of any of embodiments 1-2, wherein the ultrasonic liquid-level sensor comprises: a ultrasonic transmitter; and a ultrasonic receiver that is spaced away from the transmitter.
4. The sensor of any of embodiments 1-3, wherein the ultrasonic liquid-level sensor comprises: a piezoelectric transmitter having a resonance frequency of physical vibration between 20 kHz and 120 kHz.
5. The sensor of any of embodiments 1-4, comprising: a multi-axis accelerometer coupled to the processor, wherein the processor is configured to determine that a user has dispensed the liquid based on signals from the multi-axis accelerometer indicative of acceleration of the sensor and, in response to determining that the user has dispensed the liquid, cause the ultrasonic liquid-level sensor to measure the liquid level.
6. The sensor of embodiment 5, wherein determining that the user has dispensed the liquid comprises: determining that the sensor has accelerated upward relative to a direction of gravity, then rotated about an axis in the horizontal plane in a first direction, then rotated about an axis in the horizontal plane in a second direction, then accelerated downward, and then oriented within a threshold angle relative to the direction of gravity.
7. The sensor of embodiment 5, wherein the processor is configured to execute a gesture classifier operative to receive a sequence of signals from the multi-axis accelerometer and classify a subset of the sequence of signals as indicating that liquid was dispensed.
8. The sensor of any of embodiments 1-7, comprising: a gyroscope coupled to the processor, wherein the processor is configured to determine that a user has opened the container based on signals from the gyroscope indicative of the sensor twisting in a first direction and, in response to determining that the user has opened the container, cause the ultrasonic liquid-level sensor to measure the liquid level.
9. The sensor of embodiment 8, wherein determining that a user has opened the container comprises determining that the user has closed the container based on signals from the gyroscope indicative of the sensor twisting in a second direction different from the first direction.
10. The sensor of any of embodiments 1-9, comprising: a three or more axis accelerometer coupled to the processor, wherein the processor is configured to: receive a sequence of signals from the accelerometer indicative of accelerations of the sensor over time; determine that the sequence of signals indicate accelerations occurring within a threshold range of frequencies; and determine that the sequence of signals is not indicative of a user dispensing the liquid based on the determination the sequence of signals indicate accelerations occurring within a threshold range of frequencies.

11. The sensor of any of embodiments 1-10, comprising: an accelerometer coupled to the processor, wherein the processor is configured to periodically determine whether the accelerometer indicates the hand-held liquid container is oriented vertically and in response to determining that the hand-held liquid container is oriented vertically, measure the level of the liquid in the container.

12. The sensor of any of embodiments 1-11, comprising: a temperature sensor coupled to the processor, wherein the temperature sensor is operative to measure a temperature of air in the container between the ultrasonic liquid-level sensor and a surface of the surface of the liquid, wherein the processor is configured to calculate a distance between the ultrasonic liquid-level sensor and the surface of the liquid based on both the temperature of the air measured by the temperature sensor and a duration of time an ultrasonic sound wave takes to travel from the ultrasonic liquid-level sensor to the surface of the liquid and back to the ultrasonic liquid-level sensor, wherein the processor is operative to calculate longer distances in response to higher temperatures for a given duration of time.

13. The sensor of any of embodiments 1-12, comprising: a filter configured to receive signals indicative of ultrasonic vibrations and selectively pass a subset of the signals indicative of an ultrasonic echo from the surface of the liquid.

14. The sensor of embodiment 13, wherein the filter comprises an analog band pass filter.

15. The sensor of embodiment 13, wherein the processor includes a digital signal processor configured to selectively pass the subset of the signals.

16. The sensor of any of embodiments 1-15, wherein the processor is configured to: cause the ultrasonic liquid-level sensor to emit an ultrasonic sound; receive a sequence of signals from the ultrasonic liquid-level sensor indicative of a plurality of echoes from the emitted ultrasonic sound; and select an echo corresponding to the surface of the liquid from among the plurality of echoes.

17. The sensor of embodiment 16, wherein selecting the echo corresponding to the surface of the liquid from among the plurality of echoes comprises: determining an amplitude of each of the plurality of echoes; and selecting an echo having the highest amplitude among the plurality of echoes as the echo corresponding to the surface of the liquid.

18. The sensor of any of embodiments 1-17, wherein the processor is operative to cause the ultrasonic liquid-level sensor to indicate a distance from a transmitter of the ultrasonic liquid-level sensor to the surface of the liquid, wherein indicating the distance comprises: causing the transmitter to vibrate for a plurality of milliseconds; and after causing the transmitter to vibrate for a plurality of milliseconds, delaying for a resting period and, then, causing the transmitter to emit plurality of ultrasonic pulses separated from one another by temporal guard bands.

19. The sensor of any of embodiments 1-18, comprising: a buffer memory, wherein the processor is configured to: obtain a plurality of time-stamped indications of levels of the liquid; store the plurality of time-stamped indications of levels of the liquid in the buffer memory; establish a wireless connection with computing device via the radio transmitter; retrieve the time-stamped indications of levels of the liquid from the buffer memory; and convey the time-stamped indications of levels of the liquid to the computing device via the wireless connection.

20. The sensor of any of embodiments 1-19, comprising: a bottle sized to be hand held by a user, wherein the bottle is attachable to the portable power source, the ultrasonic liquid-level sensor, the radio transmitter, and the processor; and a mobile computing device having another processor, another radio, an operating system, a cellular connection to a remote server, and a hydration tracking application stored in memory of the mobile computing device, wherein the hydration tracking application, when executed by the mobile computing device, is operative to receive, via a wireless connection between the radio and the other radio, data describing additions of, and removal of, liquid in the bottle over time and integrate the additions and removals over time to estimate an amount of liquid consumed by a user, wherein the hydration tracking application, when executed, is further operative to cause the amount of liquid consumed to be conveyed via the cellular connection and the Internet to the remote server for storage.

What is claimed is:

1. A self-powered liquid level sensor, the sensor comprising:
   a mechanical connector configured to mate with a container of a liquid;
   a power source coupled to the mechanical connector;
   an ultrasonic transducer coupled to the mechanical connector;
   a radio coupled to the mechanical connector;
   a processor coupled to the mechanical connector and communicatively coupled to the power source, the ultrasonic transducer, and the radio; and
   memory coupled to the mechanical connector and communicatively coupled to the processor, the memory storing instructions that when executed by the processor effectuate operations comprising:
      waking the processor from a lower-power state to a higher-power state;
      causing the ultrasonic transducer to vibrate and drive an ultrasonic sound wave into the container of the liquid;
      determining a value indicative of an amount of liquid in the container by measuring a duration of time elapsed between when the ultrasonic transducer drives the ultrasonic sound wave and when an echo of the sound wave is received by the ultrasonic transducer;
      storing the value in a buffer memory;
      returning the processor to the lower power state; and
      transmitting the value in the buffer memory with the radio,
   wherein:
      the memory, the processor, and a digital signal processor coupled to the ultrasonic transducer are part of a system-on-a-chip;
      the memory comprises flash memory configured to preserve data in the absence of power; and
      the processor is a special-purpose processor coupled to a crystal configured to vibrate and output a clock signal by which the special-purpose processor determines a time-of-flight of the sound wave to the surface of the liquid in the container and back to the ultrasonic transducer.

2. The self-powered liquid level sensor of claim 1, wherein:
the mechanical connector is connected to a housing in which the power source, the ultrasonic transducer, the radio, the processor, and the memory are each at least partially disposed;
the power source comprises a battery;
the ultrasonic transducer comprises:
an ultrasonic transmitter configured to vibrate at between 20 kHz and 120 kHz;
an ultrasonic receiver, spaced away from the ultrasonic transmitter, configured to receive echoes from within the container;
the sensor comprises a vibration dampener disposed between the ultrasonic receiver and the ultrasonic transmitter; and
the processor increases a sampling rate of at least one sensor and a beacon-transmission amount of the radio as a result of transition from the lower-power state to the higher-power state; and
the sensor comprises the container, and the container is sized to be hand held.

3. The self-powered liquid level sensor of claim 1, wherein:
causing the ultrasonic transducer to vibrate comprises:
driving a warm-up vibration of the ultrasonic transducer; and
after driving the warm-up vibration, causing the ultrasonic transducer to vibrate in a plurality of bursts, each separated from consecutive bursts by a resting duration;
determining a value indicative of an amount of liquid in the container comprises:
receiving a plurality of sets of echoes, each set of echoes comprising a plurality of echoes caused by one of the bursts;
for each of the sets of echoes, selecting an echo to obtain a plurality of selected echoes; and
determining the value indicative of the amount of liquid in the container based on a measure of central tendency based on the plurality of selected echoes.

4. The self-powered liquid level sensor of claim 1, comprising:
means for concentrating and directing sound waves coupled to the ultrasonic transducer, wherein the ultrasonic transducer comprises a piezoelectric actuator having a natural frequency greater than 20 kHz.

5. The self-powered liquid level sensor of claim 1, wherein:
the ultrasonic transducer comprises a single actuator configured to both transmit the sound wave and sense the echo, wherein the operations comprise driving a signal to the actuator that is out of phase relative to the vibration between driving the sound wave and receiving the echo of the sound wave to suppress interference from residual vibrations.

6. The self-powered liquid level sensor of claim 1, wherein:
the power source comprises a photovoltaic power source;
the radio does not transmit beacons in the lower-power state and does transmit beacons in the higher-power state.

7. The self-powered liquid level sensor of claim 1, wherein:
the processor is a microcontroller coupled to the ultrasonic transducer via a data bus on a printed circuit board, wherein the microcontroller comprises an interrupt handler configured to take action in responsive to interrupt signals received via the data bus.

8. The self-powered liquid level sensor of claim 1, comprising: means for selecting among a plurality of echoes.

9. The self-powered liquid level sensor of claim 1, comprising: means for classifying a gesture.

10. The self-powered liquid level sensor of claim 1, comprising: means for determining that a liquid has been dispensed.

11. The self-powered liquid level sensor of claim 1, comprising: means for determining an amount of liquid in the container.

12. The self-powered liquid level sensor of claim 1, comprising: means for preventing transmission of the sound wave from interfering with receipt of the echo.

13. The self-powered liquid level sensor of claim 1, the operations comprising:
sensing an angle relative to a direction of gravity;
determining that the angle is less than a threshold angle; and
in response, causing the ultrasonic transducer to vibrate and drive the ultrasonic sound wave.

14. The self-powered liquid level sensor of claim 1, wherein:
the digital signal processor is configured to apply a band-pass filter to a signal based on the echo.

15. The self-powered liquid level sensor of claim 1, comprising:
an analog filter configured to filter signals received by the ultrasonic transducer.

16. The self-powered liquid level sensor of claim 1, comprising:
a tangible, non-transitory media storing a program that when installed on a mobile computing device and executed by the mobile computing device effectuate operations comprising:
wirelessly receiving a beacon transmitted by the radio;
in response to the beacon, wirelessly transmitting a request to initiate two-way communication to the radio;
wirelessly receiving the value and a plurality of other values indicative of liquid levels at other times from the radio; and
transmitting data indicative of the value and the plurality of other values to a remote server.

17. The self-powered liquid level sensor of claim 16, comprising:
transmitting values from a plurality of different containers to the remote server.

18. The self-powered liquid level sensor of claim 17, comprising:
another tangible, non-transitory media storing another program that when executed by one or more computers in communication with, or by, the server effectuate operations comprising:
sending instructions to another computing device to display a dashboard user interface indicative of the values from the plurality of different containers.

19. The self-powered liquid level sensor of claim 1, comprising:
a location sensor, wherein the operations comprise obtaining a measure of weather at a geolocation indicated by the sensor.

20. A self-powered liquid level sensor, the sensor comprising:
a mechanical connector configured to mate with a container of a liquid;

a power source coupled to the mechanical connector;
an ultrasonic transducer coupled to the mechanical connector;
a radio coupled to the mechanical connector;
a processor coupled to the mechanical connector and communicatively coupled to the power source, the ultrasonic transducer, and the radio; and
memory coupled to the mechanical connector and communicatively coupled to the processor, the memory storing instructions that when executed by the processor effectuate operations comprising:
 waking the processor from a lower-power state to a higher-power state;
 causing the ultrasonic transducer to vibrate and drive an ultrasonic sound wave into the container of the liquid;
 determining a value indicative of an amount of liquid in the container by measuring a duration of time elapsed between when the ultrasonic transducer drives the ultrasonic sound wave and when an echo of the sound wave is received by the ultrasonic transducer;
 storing the value in a buffer memory;
 returning the processor to the lower power state; and
 transmitting the value in the buffer memory with the radio,
wherein the ultrasonic transducer comprises a single actuator configured to both transmit the sound wave and sense the echo, wherein the operations comprise driving a signal to the actuator that is out of phase relative to the vibration between driving the sound wave and receiving the echo of the sound wave to suppress interference from residual vibrations.

21. The self-powered liquid level sensor of claim 20, wherein:
the mechanical connector is connected to a housing in which the power source, the ultrasonic transducer, the radio, the processor, and the memory are each at least partially disposed;
the power source comprises a battery;
the ultrasonic transducer comprises:
 an ultrasonic transmitter configured to vibrate at between 20 kHz and 120 kHz;
 an ultrasonic receiver, spaced away from the ultrasonic transmitter, configured to receive echoes from within the container;
the sensor comprises a vibration dampener disposed between the ultrasonic receiver and the ultrasonic transmitter; and
the processor increases a sampling rate of at least one sensor and a beacon-transmission amount of the radio as a result of transition from the lower-power state to the higher-power state; and
the sensor comprises the container, and the container is sized to be hand held.

22. The self-powered liquid level sensor of claim 20, wherein:
causing the ultrasonic transducer to vibrate comprises:
 driving a warm-up vibration of the ultrasonic transducer; and
 after driving the warm-up vibration, causing the ultrasonic transducer to vibrate in a plurality of bursts, each separated from consecutive bursts by a resting duration;
determining a value indicative of an amount of liquid in the container comprises:
 receiving a plurality of sets of echoes, each set of echoes comprising a plurality of echoes caused by one of the bursts;
 for each of the sets of echoes, selecting an echo to obtain a plurality of selected echoes; and
 determining the value indicative of the amount of liquid in the container based on a measure of central tendency based on the plurality of selected echoes.

23. The self-powered liquid level sensor of claim 20, comprising:
means for concentrating and directing sound waves coupled to the ultrasonic transducer, wherein the ultrasonic transducer comprises a piezoelectric actuator having a natural frequency greater than 20 kHz.

24. The self-powered liquid level sensor of claim 20, wherein:
the ultrasonic transducer comprises a single actuator configured to both transmit the sound wave and sense the echo, wherein the operations comprise driving a signal to the actuator that is out of phase relative to the vibration between driving the sound wave and receiving the echo of the sound wave to suppress interference from residual vibrations.

25. The self-powered liquid level sensor of claim 20, wherein:
the power source comprises a photovoltaic power source;
the radio does not transmit beacons in the lower-power state and does transmit beacons in the higher-power state.

26. The self-powered liquid level sensor of claim 20, wherein:
the processor is a microcontroller coupled to the ultrasonic transducer via a data bus on a printed circuit board, wherein the microcontroller comprises an interrupt handler configured to take action in responsive to interrupt signals received via the data bus.

27. The self-powered liquid level sensor of claim 20, comprising: means for selecting among a plurality of echoes.

28. The self-powered liquid level sensor of claim 20, comprising: means for determining that a liquid has been dispensed.

29. The self-powered liquid level sensor of claim 20, comprising: means for preventing transmission of the sound wave from interfering with receipt of the echo.

30. The self-powered liquid level sensor of claim 20, the operations comprising:
sensing an angle relative to a direction of gravity;
determining that the angle is less than a threshold angle; and
in response, causing the ultrasonic transducer to vibrate and drive the ultrasonic sound wave.

31. The self-powered liquid level sensor of claim 20, comprising:
a digital signal processor configured to apply a band-pass filter to a signal based on the echo; or
an analog filter configured to filter signals received by the ultrasonic transducer.

32. The self-powered liquid level sensor of claim 20, comprising:
a tangible, non-transitory media storing a program that when installed on a mobile computing device and executed by the mobile computing device effectuate operations comprising:
 wirelessly receiving a beacon transmitted by the radio;

in response to the beacon, wirelessly transmitting a request to initiate two-way communication to the radio;

wirelessly receiving the value and a plurality of other values indicative of liquid levels at other times from the radio; and transmitting data indicative of the value and the plurality of other values to a remote server.

33. The self-powered liquid level sensor of claim 32, comprising:

transmitting values from a plurality of different containers to the remote server; and another tangible, non-transitory media storing another program that when executed by one or more computers in communication with, or by, the server effectuate operations comprising:

sending instructions to another computing device to display a dashboard user interface indicative of the values from the plurality of different containers.

* * * * *